United States Patent [19]

Marzocchi

[11] 3,775,163

[45] Nov. 27, 1973

[54] METHOD FOR IMPROVING THE BOND BETWEEN GLASS FIBERS AND ELASTOMERIC MATERIALS

[75] Inventor: Alfred Marzocchi, Cumberland, R.I.

[73] Assignee: Owens-Corning Fiberglas Corporation, Toledo, Ohio

[22] Filed: Nov. 29, 1968

[21] Appl. No.: 780,252

[52] U.S. Cl............................ 117/126 GB, 117/163
[51] Int. Cl...................... B32b 17/10, B32b 25/10
[58] Field of Search.............. 260/846; 117/126 GR, 117/163, 126 GB

[56] References Cited
UNITED STATES PATENTS
2,902,459  9/1959  Teppema...................... 260/846 X
3,424,608  1/1969  Marzocchi et al.............. 117/126 X

OTHER PUBLICATIONS

Groggins, Unit Processes In Organic Synthesis, McGraw-Hill Book Co., 3rd Ed., (1947), pp. 426–427, 429–430.

Primary Examiner—William D. Martin
Assistant Examiner—William H. Schmidt
Attorney—Staelin and Overman and Herman I. Hersh

[57] ABSTRACT

Glass fiber - elastomeric products wherein the glass fiber component is treated prior to combination with elastomeric material with a composition containing a resorcinol formaldehyde resin and one or more elastomeric materials in which the resorcinol formaldehyde resin has been subjected to air oxidation by bubbling air therethrough prior to application onto the glass fiber surfaces.

4 Claims, No Drawings

METHOD FOR IMPROVING THE BOND BETWEEN GLASS FIBERS AND ELASTOMERIC MATERIALS

This invention relates to elastomeric products reinforced or otherwise combined with glass fibers and it relates more particularly to the method and compositions employed in the treatment of the glass fibers to enhance the bonding relationship between the glass fibers and the elastomeric materials for making fuller utilization of the desirable characteristics of the glass fibers in their combination with the elastomeric materials.

The term "glass fibers," as used herein, shall refer to (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air directed angularly downwardly onto multiple streams of molten glass issuing from the bottom side of a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continuous and discontinuous fibers in strand, yarn, cord and fabrics formed thereof.

As used herein, the term "elastomer" is meant to include natural rubber in the cured or uncured stage, vulcanized or unvulcanized stage, and synthetic organic elastomeric materials such as butadiene-styrene copolymer, butadiene-acrylonitrile copolymer, butyl rubber, polysulfide rubbers, EPDM rubbers, chloroprene, isoprene, neoprene, isobutyl rubber and the like elastomeric polymers and copolymers in their cured or uncured stages, and vulcanized or unvulcanized stages.

The invention is addressed to the fuller utilization of the desirable characteristics of glass fibers, such as their high strength, flexibility, thermal stability, chemical stability, inertness, electrical resistance and heat conductive characteristics when used in combinations with elastomeric materials as a reinforcement or as a stabilizing agent in belt manufacture, as reinforcing cords and fabrics to increase strength, life, wear-ability, and service characteristics in rubber tires, and as a reinforcement and the like in other elastomeric coated fabrics and molded elastomeric products.

It is an object of this invention to provide a new and improved composition which may be used as a forming size for treatment of glass fibers in forming or preferably as an impregnating composition for treatment, in forming or afterwards, of bundles, yarns, cords, strands and fabrics formed of glass fibers to enable fuller utilization to be made of the desirable characteristics of the glass fibers when used in combination with elastomeric materials in the manufacture of glass fiber reinforced molded products and coated fabrics.

More specifically, it is an object of this invention to provide a composition for use in the treatment of glass fibers in forming to improve the processing and the performance characteristics of the glass fibers as a reinforcement for elastomeric materials and for use in the treatment of bundles, strands, yarns, cords and fabrics of glass fibers, in forming or afterwards, to enhance their bonding relationship when used in combination with elastomeric materials in the manufacture of glass fiber reinforced plastics, laminates or coated fabrics and it is a related object to provide a method and means for making fuller utilization of the strength properties of glass fibers when used as a reinforcement for elastomeric materials.

To the present, glass fibers which have been added or otherwise incorporated with elastomeric materials, in the form of continuous or chopped fibers, have functioned more or less as a filler than as a reinforcement, or flexibilizing agent, or stabilizing agent. As a result, little, if any, improvements in mechanical and physical properties have been made available from the combinations which made use of glass fibers in products formed of elastomeric materials. It is believed that the failure to make fuller utilization of some of the more desirable properties of the glass fiber components resides in the inability properly to integrate the glass fibers with the elastomeric system.

Investigations have been conducted over the past several years by the most highly skilled in the art in the attempt to make fuller utilization of the glass fiber components formulated into elastomeric materials in the endeavor to fabricate products having new and improved physical and mechanical properties. Substantial inroads are now being made as represented by the practice of this invention, as will hereinafter be described.

The invention will be described with reference to a new and improved composition which can be employed as an original size applied to the glass fibers in forming thereby individually to coat each of the glass fiber filaments subsequently formed into the strand, yarn, cord or fabric to provide both the desired processing and performance characteristics for processing the sized glass fibers in the formation of the strand and in the twisting and plying of the strands into yarns or cords and in the processing of the strands, yarns or cords into fabrics and the desired performance characteristics for enhancing the bonded relationship when the sized glass fibers are combined with elastomeric materials in the manufacture of reinforced elastomeric products.

In the preferred practice of this invention, the composition is formulated as an impregnating composition for treatment of strands, yarns, cords and fabrics formed of previously sized glass fibers for penetration of the treating composition into the strand, yarn, cord or fabric with the intention of individually coating the fibers to protect the fibers against destruction by mutual abrasion while establishing a bonded relationship therewith or else penetrating the glass fiber strand, yarn, cord or fabric sufficiently to intertie the glass fiber system with the elastomeric materials with which the glass fibers are combined in the manufacture of glass fiber - elastomeric products.

In the copending application Ser. No. 633,654, filed Mar. 22, 1967 and entitled "Glass Fiber Reinforced Elastomers", now U.S. Pat. No. 3,424,608, description is made of a treating composition in the form of a composition for sizing individual glass fibers or for impregnating bundles of glass fibers wherein the treating composition is in the form of an aqueous composition containing as its essential ingredients two to 10 parts by weight of a resorcinol formaldehyde resin, six to 20 parts by weight of a butadiene-styrene-vinyl pyridine terpolymer, 12.5 to 20 parts by weight of a neoprene rubber and three to nine parts by weight of a butadiene rubber, when used as an impregnating composition, and which includes 0.1 to three parts by weight of an anchoring agent in the form of an amino or epoxy silane or an amino or epoxy Werner complex compound, when used as a size composition.

In the copending application Ser.No. 494,654, filed Oct. 11, 1965, and entitled "Glass Fiber Size Composition and Products," now abandoned, description is made of a composition for treating glass fibers for use as a glass fiber size or impregnating composition wherein the composition is formulated of an aqueous system containing as its essential ingredients one to six parts by weight resorcinol formaldehyde resin, 15 to 45 parts by weight butadiene-styrene-vinyl pyridine terpolymer, 30 to 60 parts by weight neoprene rubber, three to 12 parts by weight carbon black, when used as an impregnating composition, and which includes 0.1 to three parts by weight of an anchoring agent of the type previously described, when used as a size composition.

In my copending application Ser. No. 398,305, filed Sept. 22, 1964, and entitled "Glass Fiber Reinforced Elastomers", now abandoned, description is made of a composition for treating glass fibers as a size or as an impregnant for bundles of glass fibers wherein the treating composition comprises an aqueous system having as its essential ingredients, resorcinol formaldehyde resin and a natural rubber latex, when used as an impregnant, and which includes 0.1 to five percent by weight of an anchoring agent of the type described, when used as an impregnant or size composition.

In the copending application of which I am co-applicant, Ser. No. 595,036, entitled "Tack-free Impregnated Glass Fiber Reinforcement for Elastomeric Materials,"now U.S. Pat. No. 3,567,671, description is made of a treating composition for use as a size for individual glass fibers or as an impregnant for bundles of glass fibers wherein the treating composition is an aqueous system having as its essential ingredients two to 10 percent by weight resorcinol formaldehyde resin, 20 to 60 percent by weight butadiene-styrene-vinyl pyridine terpolymer, 15 to 40 percent by weight of a latex of carboxylated butadiene styrene, acrylic resin or vinyl chloride - vinylidene chloride resin, and five to 30 percent by weight of an incompatible wax.

It has now been found that when air is bubbled through the resorcinol formaldehyde component of a size or impregnating composition, either before or preferably after combination with the elastomeric component of the size or impregnating composition, the interbonded relationship between the continuous phase elastomer and the glass fiber reinforcement and the compatibility of the glass fiber reinforcement with the matrix of elastomeric material is unexpectedly markedly increased.

It is believed that the exposure to air, prior to the treatment of the glass fibers, effects oxidation of the resorcinol formaldehyde component which tends to enhance interbonding and compatibility with the elastomeric material. There is evidence of the fact that the number of ether, acid and/or aldehyde groups are increased at the expense of methylol or formaldehyde groups on the resorcinol formaldehyde resin and that this may also be a factor in the formation of reactive surfaces that promote adhesion and enhance compatibility between the treated glass fibers and the rubber matrix of the product. There is also reason to believe that double bonds present in the vinyl pyridine-butadiene-styrene terpolymer are oxidized to provide groupings capable of enhancing the bond and interaction with the resorcinol formaldehyde resin as well as the rubber stock during subsequent vulcanization.

As previously pointed out, the described unexpected effect is secured when the resorcinol formaldehyde resin is independently processed in aqueous solution or dispersion by bubbling air through the liquid medium containing the same prior to the formulation of the resorcinol formaldehyde resin into the elastomeric materials making up the size or impregnating composition. However, best results are secured when the air is bubbled through the size or impregnating composition after the resorcinol formaldehyde resin has been formulated with the rubber latex and shortly before application for treatment of the glass fiber reinforcement.

The effect secured is somewhat similar to that of aging glass fibers treated with resorcinol - elastomeric systems before combination with the matrix elastomer for molding the desired glass fiber reinforced elastomeric product. However, more consistent and better results are secured by the treatment described and claimed, possibly by reason of the reaction through the entire cross-section of the material to such oxidizing conditions, as distinguished from only the surface exposure thereof in an aging process.

The described improvements in bond and compatibility are observed when air is bubbled through the resorcinol formaldehyde resin or preferably the resorcinol formaldehyde rubber latex system for 15 minutes but it is preferred to bubble air through the material for one-half to 3 hours. When air is bubbled through the system for more than 6 hours, the compatibility and bond tend to decrease. This is believed to result from over-oxidation or cure whereby the system becomes less compatible and incapable of effecting the desired interbonding relationship with the continuous phase elastomer.

The preferred resorcinol formaldehyde resinous component comprises the condensation reaction product of 3 mols formaldehyde with 1 mol of resorcinol with an alkaline medium stabilizer, such as an amine or ammonium hydroxide. In order to maintain the alkaline conditions for stabilization during the passage of air through the formed resin, it is desirable periodically to introduce additional ammonia during the air exposure operation. For this purpose, use can be made of a 5% solution of ammonium hydroxide.

Suitable resorcinol formaldehyde resins and combinations thereof with natural rubber latex are marketed by the U. S. Rubber Company under the trade name "Lotol 5440." For the preparation of same, reference can be made to the Canadian Pat. No. 435,754 issued to the U. S. Rubber Company, in which description is made of the reaction of resorcinol and formaldehyde in the presence of a substantial amount of short chained alkylamine for purposes of stabilizing the reaction and the products formed thereof and it also describes the combination of the formed resin with rubber latex.

Having described the basic concepts of this invention, illustration will now be made of representative formulations of impregnating and size compositions embodying the same.

EXAMPLE 1

Impregnating composition:
Part A:
  732 parts by weight distilled water
  1.5 parts by weight ammonium hydroxide
  48 parts by weight resorcinol formaldehyde (42% solids)
  16 parts by weight formalin
Part B:
  900 parts by weight butadiene-styrene-vinyl pyridine terpolymer (42% solids)
  80 parts by weight ammonium hydroxide
  350 parts by weight carboxylated butadiene-styrene latex (50% solids)(Pliolite 480)
  50 parts by weight acrylic resin (50% solids) - (Rhoplex B85)
  50 parts by weight Vultex Wax No. 5 (56% solids)

EXAMPLE 2

Size Composition:
  60 parts by weight resorcinol formaldehyde resin (75% by weight solids)
  20 parts by weight formalin
  1.5 parts by weight sodium hydroxide
  900 parts by weight butadiene-styrene-vinyl pyridine terpolymer (42% solids)
  95 parts by weight ammonium hydroxide
  350 parts by weight vinyl chloride - vinylidene chloride copolymer (50% solids)
  200 parts by weight Vultex Wax No. 5 (50% solids)
  7 parts by weight gamma-aminopropyltriethoxy silane
  Water in an amount to reduce the solids content to 15%

Part A in Example 1 is separately prepared by combining the ingredients and then aging for about 2 to 3 hours with alkali present in amount sufficient to adjust the pH to between 7 and 7.5. The remainder of the ingredients are combined and the various parts are then mixed together.

EXAMPLE 3

| Impregnating Composition: | Amount in pounds |
|---|---|
| Water | 220 |
| Sodium Hydroxide | 1 |
| Resorcinol formaldehyde resin (Penacolite Resin R2170 — 70% solids) | 22 |
| Formalin (37% $CH_2O$) | 15 |
| Ammonium hydroxide (28%) | 30 |
| Vinyl pyridine terpolymer (Gentac — 41% solids) | 250 |
| Neoprene rubber latex (50% solids) | 415 |
| Butadiene rubber latex (Pliolite 2104 latex — 60% solids) | 51 |
| Carbon black (Aridye SXN — 20% solids) | 115 |

EXAMPLE 4

Size Composition

| Parts by weight solids | |
|---|---|
| 1 – 6 | Resorcinol formaldehyde latex (70% solids) |
| 15 – 40 | Vinyl pyridine terpolymer (40% solids) |
| 30 – 60 | Neoprene rubber latex (50% solids) |
| 3 – 12 | Butadiene-styrene rubber latex (60% solids) |
| 2 – 10 | Carbon black |
| 0.1 – 5 | Sodium hydroxide |
| 0.1 – 3 | Anchoring agent |

To the foregoing materials water is added to form an aqueous dispersion in amount to provide a solids content within the range of 5 to 20 percent by weight and ammonium hydroxide is incorporated in amount within the range of 1 to 5 percent by weight, and formalin is added in an amount within the range of 1 to 4 percent by weight for use as a size.

EXAMPLE 5

Impregnating Composition:
  40–80 percent by weight of a natural rubber latex - resorcinol formaldehyde resin dispersed in aqueous medium to a solids of 38% by weight
  60–20 percent by weight of water

EXAMPLE 6

Size Composition:
  15 parts by weight of the natural rubber latex - resorcinol formaldehyde resin dispersed in aqueous medium to 38% solids
  82 parts by weight of water
  3 parts by weight of gamma-aminopropyltriethoxy silane

EXAMPLE 7

Impregnating Composition:
  2.0 parts by weight resorcinol - formaldehyde resin (Penacolite resin R2170 - 70% solids)
  1.4 parts by weight formaldehyde (37% by weight solution)
  5.0 parts by weight concentrated ammonium hydroxide
  25.0 parts by weight vinyl pyridine terpolymer - 41% solids (Gentac - General Tire & Chemical Company)
  50.0 parts by weight neoprene rubber latex (50% solids)
  7.4 parts by weight butadiene latex (Pliolite 2104 - 60% solids)
  0.2 part by weight sodium hydroxide
  58.0 parts by weight water

EXAMPLE 8

Size Composition:
  2.0 parts by weight resorcinol formaldehyde resin
  1.0 parts by weight formaldehyde (37% solution)
  2.7 parts by weight concentrated ammonium hydroxide
  25.0 parts by weight vinyl pyridine terpolymer latex (42% solids)
  41.0 parts by weight neoprene rubber latex (50% solids)
  5.0 parts by weight butadiene latex (60% solids)
  .05 part by weight sodium hydroxide
  1.0 part by weight gamma-aminopropyltriethoxy silane
  1100 parts by weight water In the foregoing examples, the resorcinol formaldehyde resin of Examples 1–4, 7 and 8 and the resorcinol formaldehyde latex component in Examples 5 and 6 are processed prior to formulation with the remainder of the ingredients by bubbling air through the solution for one hour. The treated component is then combined with the remainder of the ingredients to produce the treating size or impregnating composition.

The glass fibers may be sized and the glass fiber bundles may be impregnated in the conventional manner described in the aforementioned copending applications. For example, the size compositions may be applied to the individual glass fibers as they are drawn from the molten streams issuing from the bottom side of a glass melting bushing and gathered together to form a yarn.

Impregnation of a yarn, strand, cord or fabric of glass fibers may be made by immersing the bundles of glass fibers into a liquid bath of the impregnating composition after which the excess may be wiped from the surfaces of the glass fiber bundles and heated to dry and partially cure the impregnated bundles.

When the glass fibers are sized in forming with either of the compositions, the sized glass fibers can be processed directly into strand, yarns, cords or fabrics for use in the combination with the elastomeric material without the need for impregnation of the bundles since the individual fibers in the bundles are already provided with a coating having the desired components for integration with the continuous phase elastomeric material and for protecting the glass fibers.

In the combination with the elastomeric materials, the glass fibers or bundles of glass fibers, which are processed in accordance with the process of this invention, are mixed with the elastomeric material or otherwise laid down in the desired arrangement for combination with the elastomeric material and processed in the conventional manner by molding, vulcanization or cure under heat and pressure to advance the elastomeric phase to a cured or vulcanized stage in the combination with the treated glass fibers whereby the coating or impregnant provided on the glass fiber surfaces or in the bundles of glass fibers operate to integrate the continuous phase elastomeric material with the glass fibers whereby the glass fibers become integrated to form a part of the elastomeric product.

Instead of air used in the treatment of the resorcinol formaldehyde component of the treating compositions, oxygen or an oxygen containing gas may be bubbled through the liquid composition containing the resorcinol formaldehyde resin.

It will be apparent that I have provided a new and improved composition for use in the treatment of glass fibers and bundles formed thereof to enhance the integration and compatibility between the glass fiber reinforcement and the continuous phase elastomeric material in the manufacture of glass fiber - elastomeric products.

It will be understood that changes may be made in the details of formulation and operation without departing from the spirit of the invention especially as defined in the following claims.

I claim:

1. In the treatment of glass fibers for use as reinforcement for elastomeric materials in the manufacture of glass fiber-reinforced elastomeric products wherein glass fibers, prior to combination with said elastomeric materials, when in individual form are coated and when in bundle form are impregnated, with an alkaline latex containing as essential ingredients a resorcinol-formaldehyde resin and one or more elastomers, the improvement comprising bubbling a molecular oxygen-containing gas through the latex containing the resorcinol-formaldehyde resin under alkaline conditions for a period of one-fourth to 6 hours.

2. The treatment as claimed in claim 1 in which the oxygen containing gas is air.

3. The treatment as claimed in claim 1 in which the oxygen containing gas is bubbled through a liquid containing the resorcinol-formaldehyde resin before combination of the resin with the elastomer.

4. The treatment as claimed in claim 1 in which the oxygen containing gas is bubbled through a liquid containing the resorcinol-formaldehyde resin while in admixture with the elastomer.

* * * * *